(12) United States Patent
Hamerski et al.

(10) Patent No.: US 6,558,789 B1
(45) Date of Patent: May 6, 2003

(54) REMOVABLE TAPE LAMINATE INCLUDING A FLEXIBLE NON-STRETCHABLE SUPPORT LAYER

(75) Inventors: Michael D. Hamerski, Township of Baldwin, WI (US); James F. Pitzen, Maplewood, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 09/437,390

(22) Filed: Nov. 10, 1999

(51) Int. Cl.⁷ ................................................. B32B 7/12
(52) U.S. Cl. .................... 428/343; 428/40.1; 428/41.8; 428/43; 428/192; 428/194; 428/317.1; 428/317.3; 428/352; 428/354
(58) Field of Search .............................. 428/40.1, 41.8, 428/43, 192, 194, 317.1, 317.3, 343, 352, 354

(56) References Cited

U.S. PATENT DOCUMENTS

| | | |
|---|---|---|
| 4,003,538 A | 1/1977 | Frye |
| 4,024,312 A | 5/1977 | Korpman |
| 4,310,137 A | 1/1982 | Frye |
| 5,409,189 A | 4/1995 | Lëhmann |
| 5,496,599 A * | 3/1996 | Schwartz et al. .......... 428/35.7 |
| 5,507,464 A | 4/1996 | Hamerski et al. |
| 5,516,581 A | 5/1996 | Kreckel et al. |
| 5,989,708 A * | 11/1999 | Kreckel ....................... 428/354 |
| 6,004,642 A | 12/1999 | Langford |
| 6,120,867 A * | 9/2000 | Hamerski et al. .......... 428/40.1 |

FOREIGN PATENT DOCUMENTS

| | | |
|---|---|---|
| DE | 42 33 872 A1 | 10/1992 |
| DE | 43 39 604 A1 | 11/1993 |
| DE | 196 32 182 A1 | 8/1996 |
| WO | WO 95/06691 | 3/1995 |
| WO | WO 99/31193 | 6/1999 |
| WO | WO 99/37729 | 7/1999 |

* cited by examiner

*Primary Examiner*—Terrel Morris
*Assistant Examiner*—Hai Vo
(74) *Attorney, Agent, or Firm*—William L. Huebsch (57) ABSTRACT

A tape laminate adapted to support or locate an object along a substrate. The tape laminate comprises a support layer of strong, flexible, conformable, essentially non stretchable material having firmly attached thereto an attachment strip comprising a layer of stretch release adhesive defining an exposed major surface that is adapted to adhere the attachment strip to the substrate. In one embodiment, consisting only of the conformable support layer and the attachment strip, the tape laminate can be used to support or locate an object along a substrate (e.g., along a vertical wall) by conforming the tape laminate to the contour of portions of the object and of the wall and adhering a part of the layer of stretch release adhesive to each of those portions. In other embodiments, the tape laminate further includes means such as separable fasteners, twist ties, cable ties, elastic bands, or hooks for facilitating engagement of objects to be supported or located by the tape laminate.

16 Claims, 5 Drawing Sheets

REMOVABLE TAPE LAMINATE INCLUDING A FLEXIBLE NON-STRETCHABLE SUPPORT LAYER

FIELD OF THE INVENTION

The present invention relates to structures by which objects may be located or supported along a substrate.

BACKGROUND OF THE INVENTION

Laminated tape structures including a central layer of polymeric film or foam with layers of adhesive on its opposite major surfaces (e.g., the tape structures sold under the trade designations "Wallsaver Removable poster tape", "3M Automotive attachment Tape", or "3M Acrylic Foam Tape" by Minnesota Mining and Manufacturing Company, St. Paul, Minn.) have been used to bond the opposed surfaces of two objects together, such as to bond a wall hanging such as a poster, plaque, or a picture to a wall. When such a tape structure in which the adhesive is a high tack pressure sensitive adhesive (e.g., the "3M Acrylic Foam Tape" mentioned above) is used for that purpose, it is often difficult to later separate the objects. The tape structure is positioned in a very narrow area between the objects where it is not readily accessible, particularly when the tape structure is between a rigid wall hanging and a wall. Typically, an attempt is made to either slice the tape structure in half between its outer surfaces with a knife or similar implement poked between the objects, or one object (e.g., a wall hanging) is twisted on or pulled from the other object (e.g., a wall), often resulting in damage to one or both of the objects.

Laminated structures are described in U.S. Pat. No. 4,310,137 (Frye) that include outer attachment layers having opposite major surfaces defined by pressure sensitive adhesive that can be adhered to the opposed surfaces of closely spaced objects so that the laminated structures support one object from the other, and a separable layer of non-fusible porous material such as tissue paper between the outer attachment layers that can be separated by an outward exertion on one of the outer attachment layers away from the other.

Attachment strips having opposite major surfaces at least partially defined by pressure sensitive adhesive have been developed that can be used to bond objects together, and can subsequently be stretched by pulling on tab portions at ends of the attachment strips to cleanly separate the adhesive bonds between the attachment strips and the objects they had previously joined (e.g., see U.S. Pat. No. 5,409,189 (Luhmann), U.S. Pat. No. 5,516,581 (Kreckel et al), and U.S. Pat. No. 6,231,962 (Bries et al)). While such stretch releasable attachment strips work well, the tab portion at the end of such a attachment strip joining two or more objects should be positioned where it can be engaged by a person who later wishes to separate the objects. One of the objects can be specially made with a removable portion that covers that tab portion (see U.S. Pat. No. 5,507,464, Hamerski et al), or, if one of the objects is flexible, that flexible object may be bent to afford access to that tab portion. In many instances where rigid objects are joined, however, it may be necessary to allow the tab portion to project from between the joined objects to afford such engagement with that tab portion to remove the stretchable attachment strip from between the objects. Such a projecting tab portion can be aesthetically objectionable for some applications.

German Patent Publication DE 43 39 604 dated May 24, 1995, describes a tape structure that can be used to bond together the opposed surfaces of objects including rigid objects with no portion of the tape structure projecting from between the objects, and which subsequently affords separation of the objects by moving one of the objects relative to the other. That tape structure is described as an adhesive tape for separable adhesive joints made from a double-sided adhesive tape which has adhesive areas on opposing sides at an offset which are not adherent, whereby the non adherent areas do not, or only slightly overlap, and which allow the adhesive joint made with:them to be separated by pulling apart the non-adhesive areas, particularly by pulling in the direction of the adhesive plane.

U.S. Pat. No. 6,004,642 (Langford) discloses a tape structure that can be used to bond together the opposed surfaces of objects including rigid objects (e.g., bond a plaque or framed picture to a wall) with no portion of the tape structure projecting from between the objects, and which subsequently affords easy separation of the objects without damage to either of them. That tape structure comprises an internally separable layer having opposite major anchor surfaces. The anchor surfaces are adapted to be bonded to the opposed surfaces of objects (e.g., by layers of pressure sensitive or other types of adhesive on the anchor surfaces or by other means such as heat fusion or the use of stretch releasable attachment strips as is described below). The internally separable layer has an internal static shear strength in a direction parallel to its anchor surfaces that is adapted to support one of the objects to which it is attached from the other with its anchor surfaces vertically disposed (e.g., preferably has a static shear strength parallel to its anchor surfaces that is about equal to or exceeds the maximum static shear strength that pressure sensitive adhesive will develop with normal surfaces to which it can be adhered), and has an internal dynamic tensile strength in a direction generally normal to its anchor surfaces that will afford internal separation of the separable layer by pulling apart the objects it has joined without damaging the surfaces of those objects. In an embodiment of that laminate adapted to be easily and cleanly removed from one or both of the objects it attaches together, the laminate comprises one or two stretch releasable attachment strips each having an outer surface defined by pressure sensitive adhesive that can be adhered to an object and being stretchable by being manually pulled at an end tab portion to release adhesive engagement of its outer surface to an object to which it has been adhered.

U.S. Pat. No. 6,120,867 (Hamerski et al) describes structures that can be used to bond together the opposed surfaces of objects including rigid objects (e.g., to bond plaques or framed pictures to walls) with no portion of the tape structures projecting from between the objects, and which subsequently affords easy separation of those objects without damage to either of them. That structure is a tape laminate comprising a support layer having opposite major surfaces, first and second parts, and an anchor portion of one of its major surfaces on each of those parts. The first and second parts of the support layer are disposed with the anchor portions on opposite sides of the support layer and in generally parallel relationship. Means are provided for bonding the anchor portions to the opposed surfaces of rigid objects so that the tape laminate can support one object from the other against a static force generally parallel to the anchor portions. That means for bonding comprises a first attachment strip having inner and outer opposite major surfaces extending between its ends and comprising a first layer of adhesive defining at least a portion of its outer major surface with its inner major surface being bonded to the anchor portion on the first part. Means including a tab portion are provided for affording stretching of the first attaching strip by manually pulling on the tab portion to release adhesive engagement of the first layer of adhesive from an object to which the outer major surface of the first layer of adhesive is adhered. Also, separating means are provided for affording separation of the first and second parts of the support layer and thereby sufficient separation of rigid objects to which the anchor portions are bonded by the means for bonding with the tab portion therebetween to afford access to the tab portion and release of adhesive engagement of the first layer of adhesive from one of the rigid objects by manually stretching the attachment strip.

In one embodiment of that tape laminate, the anchor portions are both portions of the same major surface of the support layer, and the support layer is folded between its first and second parts to position the anchor portions on opposite sides of the support layer. The fold in the support layer affords pivotal movement of the first and second parts away from each other to provide the means for affording separation of the first and second parts of the support layer. Additionally, when the support layer is made from a material that can be torn, it can be torn along the fold to provide alternative means for affording separation of the first and second parts of the support layer. Thus, the tape laminate can be used, for example, to hang a picture on a wall. One of the anchor portions is attached (i.e., attached with permanent adhesive, mechanical fasteners, a stretch release attachment strip or otherwise) to the rear surface of the picture with the fold along the top edge of the picture. The other attachment portion is adhered to the wall by the stretch release attachment strip. The picture overlays all of the tape laminate so that it is not visible while it supports the picture on the wall. When removal of the picture from the wall is desired, the bottom edge of the picture is swung away from the wall. The tape laminate serves as a hinge and the parts of the tape laminate separate around the fold in the support layer. The person removing the picture can then grab the now exposed tab on the attachment strip and stretch it to remove the picture and tape laminate from the wall. This attachment and removal is done without any damage or marking of the wall or damage to the picture.

In an alternative embodiment of the tape laminate, each of the anchor portions is a portion of a different one of the opposite major surfaces of the support layer, and the support layer is generally planar to thereby position the anchor portions on opposite sides of the support layer. The support layer is adapted (e.g., perforated or scored) to be manually torn between the parts to provide the means for affording separation of the first and second parts of the support layer.

DISCLOSURE OF THE INVENTION

The present invention is an effective, simple, and versatile tape laminate adapted to support or locate an object along a substrate.

The tape laminate according to the present invention includes a support layer of strong, flexible, conformable, essentially non stretchable material; and an attachment strip comprising a first layer of stretch release adhesive defining a first major surface of the attachment strip and adapted to adhere the attachment strip to a substrate. A second major surface of the attachment strip is firmly attached to one of the major surfaces of the support layer, and a tab portion is provided at one end of the attachment strip that may be manually pulled to stretch the layer of stretch release adhesive and thereby release adhesive engagement of the layer of stretch release adhesive from the substrate to which it is adhered.

In one embodiment, consisting only of the conformable support layer and the attachment strip, the tape laminate can be used to support or locate an object along a substrate (e.g., along a vertical wall) by conforming and adhering the tape laminate to adjacent portions of the object and of the wall. The support layer will support the object and prevent the adhesive from being stretched by the weight of the object, whereas the tape laminate can be removed from the object and the wall by manually pulling on the tab portion to sequentially stretch the stretch release adhesive.

In other embodiments, the tape laminate further includes means for facilitating engagement of objects to be supported by the tape laminate.

In one such embodiment that means is provided by the tape laminate further including a fastener comprising first and second releasably engageable portions, with the portions of the fastener being attached at opposite ends of the support layer. The conformable support layer can be wrapped around one or more elongate members (e.g., one or a bundle of electrical wires or pipes), the fastener portions can be engaged, and the support layer can be adhered to a substrate (e.g., a wall or floor) by the layer of stretch release adhesive so that the tape laminate supports and/or locates the elongate member along that substrate. Removal of the tape laminate from that substrate then only requires manually pulling on the tab portion to sequentially stretch the stretch release adhesive.

In another such embodiment that means is provided by the tape laminate further including an elongate attachment member (e.g., a twist tie, cable tie, or elastic band) extending transversely across and adjacent the major surface of the support layer to which the attachment strip is firmly attached. Portions of the elongate attachment member project past the opposite edges of the support layer and are engaged or adapted to be engaged on the side of the support layer opposite the attachment strip to support or locate an object along that side of the support layer.

In yet another such embodiment that means is provided by the tape laminate further including a rigid hook attached at one end of the support layer on the side of the support layer opposite the attachment strip. The hook is adapted to support or locate an object along the side of the support layer opposite the attachment strip.

BRIEF DESCRIPTION OF DRAWING

The present invention will be further described with reference to the accompanying drawing wherein like reference numerals refer to like parts in the several views, and wherein.

DETAILED DESCRIPTION

Figures 1, 2, 3:
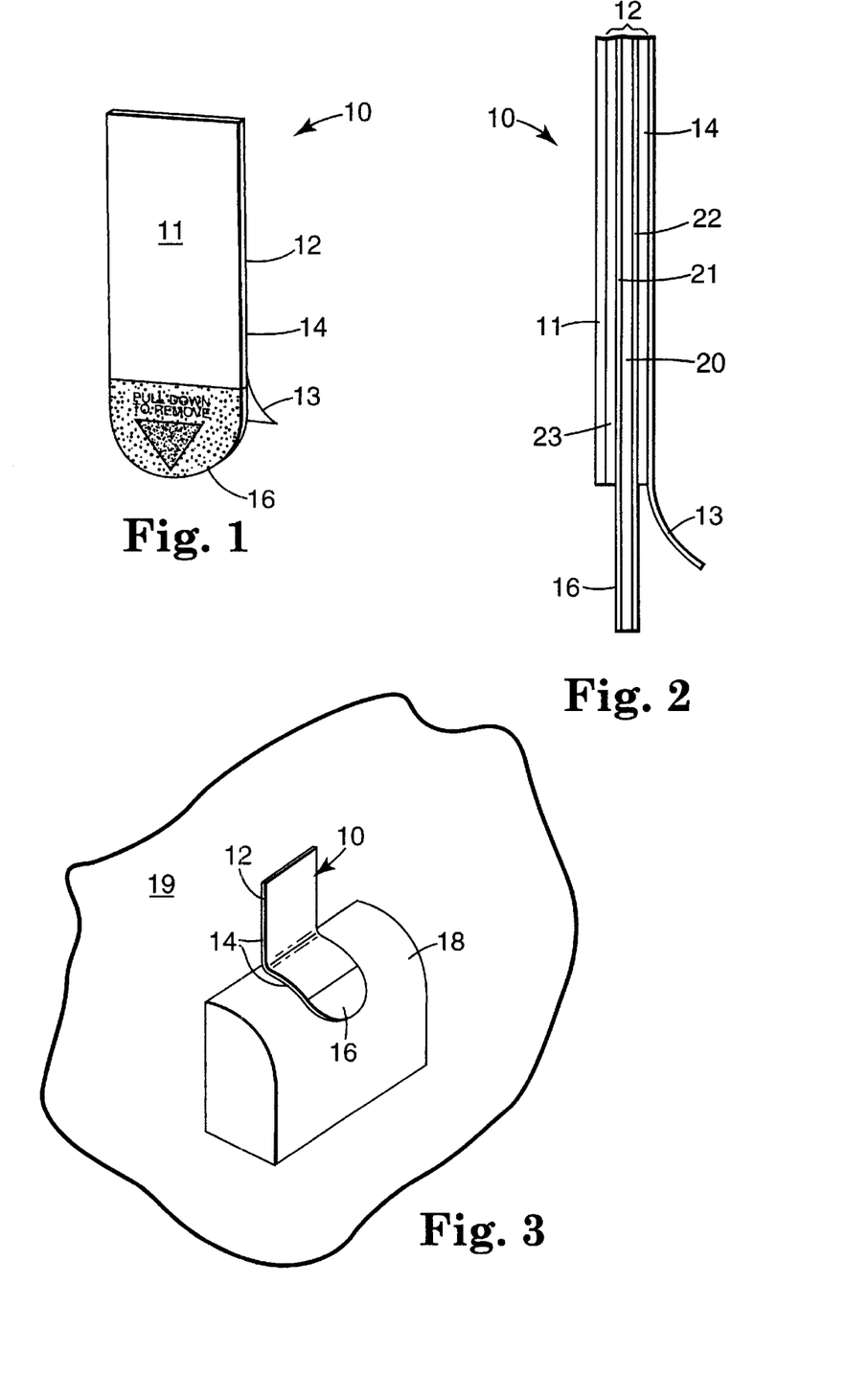
FIG. 1 is a perspective view of a first embodiment of a tape laminate according to the present invention.
FIG. 2 is an enlarged fragmentary edge view of the tape laminate of FIG. 1.
FIG. 3 is a perspective view of the tape laminate of FIG. 1 supporting and locating an object along a vertical wall.

Referring now to FIGS. 1, 2, and 3 of the, drawing, there is illustrated a first embodiment of a tape laminate according to the present invention generally designated by the reference numeral 10.

The tape laminate 10 consists of a support layer 11 of strong, flexible, conformable, essentially non stretchable material (e.g., 0.004 inch or 0.01 cm thick polyester film) having opposite ends and opposite major surfaces extending between those ends; and an attachment strip 12 also having opposite ends and first and second opposite major surfaces extending between its ends. The attachment strip 12 is about the same length as the support layer 11, and the second major surface of the attachment strip 12 is firmly attached to one of the major surfaces of the support layer 11 with the opposite longitudinal edges of the attachment strip 12 and the support layer 11 parallel and aligned with each other. The attachment strip 12 comprises a first layer 14 of stretch release adhesive defining the first major surface of the attachment strip 12, which layer 14 of stretch release adhesive is adapted to adhere the tape laminate 10 to a substrate. A tab portion 16 provided at one end of the attachment strip 12 can be manually engaged and pulled by a person to sequentially stretch the layer 14 of stretch release adhesive and thereby release adhesive engagement of the first layer 14 of stretch release adhesive with the substrate to which the first major surface of the attachment strip 12 is adhered. A conventional, easily removable, release liner 13 covers the first major surface of the attachment strip 12 defined by the first layer 14 of stretch release adhesive prior to use of the tape laminate 10.

The tape laminate 10 can be used to support and/or locate an object along a substrate, such as to support and locate a block 18 along the surface of a vertical wall 19 as is illustrated in FIG. 3. The flexible tape laminate 10 is conformed to adjacent surface contours of portions of the block 18 and of the wall 19 and a part of the layer 14 of stretch release adhesive is adhered to each of those portions. The support layer 11 then supports the block 18 from the wall 19 and prevents the adhesive in the layer 14 from being stretched by the weight of the block 18. The tape laminate 10 can subsequently be removed from the block 18 and the wall 19 by manually pulling on the tab portion 16 to sequentially stretch the layer 14 of stretch release adhesive.

Preferably, the attachment strip used in the tape laminate 10 and in the other tape laminates described below is that described in U.S. Pat. No. 6,231,962 (Bries et al), or the corresponding International Published Application WO 95/06691, the contents whereof are incorporated herein by reference. Generally, as is illustrated in FIG. 2, that attachment strip 12 comprises a central layer 20 of polymeric foam (e.g., polyolefin foam), two layers 21 and 22 of stretchable polymeric film (e.g., polyethylene or polypropylene film, with linear low density and ultra linear low density polyethylene film being preferred) bonded along opposite major surfaces of the layer 20 of foam, a second layer 23 of stretch release adhesive that adheres the layer 21 of film adjacent the support layer 11 to the support layer 11, and the first layer 14 of adhesive that is adhered along the surface of the layer 22 of film opposite the central layer 20. When that attachment strip 12 is then sequentially stretched by pulling on the tab portion 16, the layers of adhesive 14 and 23 will release respectively from the surfaces to which the tape laminate 10 is adhered by the attachment strip 12 and from the support layer 11. If the attachment strip 12 used is that described in U.S. patent application Ser. No. 08/308,937 or the corresponding International Published Application WO 95/06691 it preferably is about one half or five eighths inch (1.27 or 1.6 centimeters) wide and for most applications should be no more than about three quarter inch (1.9 centimeter) wide, as a wider attachment strip 12 might be too difficult to stretch to cause release of the layers 14 and 22 of adhesive. The layers 14 and 23 of adhesive on the attachment strip 12 can be made as long as necessary to provide the desired amount of holding force on adjacent substrates (e.g., adjacent surface portions of the block and the wall 18).

Alternatively, the attachment strip used in the tape laminate 10 and the other tape laminates described below could consist of two layers of adhesive that define the major adhesive surfaces adhered along opposite major surfaces of a single layer of stretchable polymeric film, or could be the attachment strip described in U.S. Pat. No. 5,409,189 (Luhmann), the content whereof is incorporated herein by reference, which attachment strip consists of a single layer of pressure sensitive adhesive that would define the two major adhesive surfaces, and has a polymeric film covering over its projecting tab end portion to provide non-sticky surfaces for its tab portion by which the layer of pressure sensitive adhesive can be stretched to cause it to release from surfaces between which it has been adhered.

The support layer for the tape laminate 10 and the other tape laminates described below should be strong, flexible, conformable, and essentially non stretchable (i.e., the support layer should stretch less than 50 percent before breaking). Suitable materials from which the support layer can be made include polymeric materials such as polyester (e.g., 0.0005 to 0.01 inch or 0.0013 to 0.025 cm thick), Mylar, Kevlar, PVC, polyolefin, which polymeric materials may, optionally, be reinforced (e.g., fabric reinforced vinyl, or polymeric materials reinforced with fiberglass filaments as are the backings of filament tape. Other suitable materials from which the support layer can be made include metals in thin layers such as aluminum foil; paper; or woven or non-woven fabrics or scrims.

By stating with respect to the tape laminate 10 and the other tape laminates described below that the second major surface of the attachment strip is firmly attached to one of the major surfaces of the support layer we mean that there is adhesion or another form of bonding therebetween (e.g., the support layer could be coated on the attachment strip) that will require a peal force of at least 100 grams per inch or 39.4 grams per centimeter to peal the attachment strip from the support layer.

Figure 4:
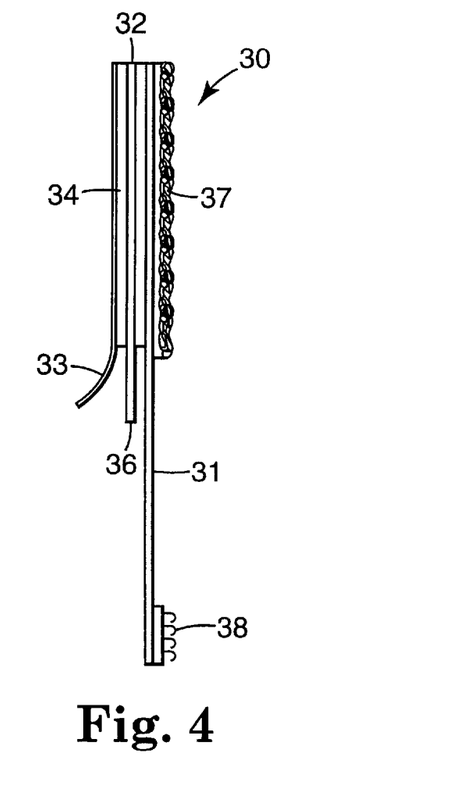
FIG. 4 is a side view of a second embodiment of a tape laminate according to the present invention.
Figure 5:
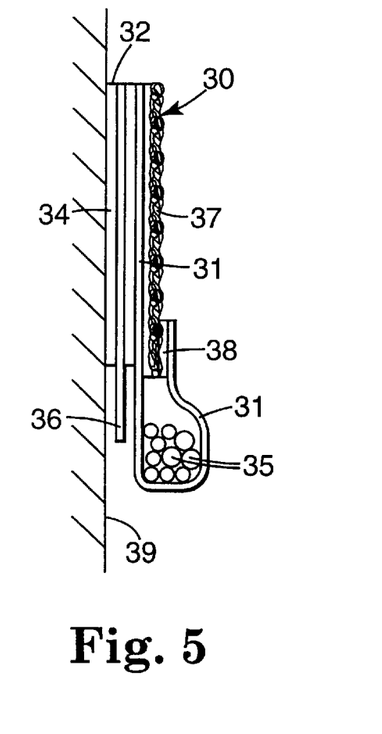
FIG. 5 is a side view of the tape laminate of FIG. 4 supporting an object along a vertical wall.

Referring now to FIGS. 4 and 5 of the drawing, there is illustrated a second embodiment of a tape laminate according to the present invention generally designated by the reference numeral 30.

The tape laminate 30 consists of a support layer, 31 of strong, flexible, conformable, essentially non stretchable material (e.g., 0.004 inch or 0.01 cm thick polyester film) having opposite ends and opposite major surfaces extending between those ends; and an attachment strip 32 also having opposite ends and first and second opposite major surfaces extending between its ends. The attachment strip 32 is about one third to one half the length of the support layer 31 (e.g., the support layer 31 can have a length of about 3 inches or 7.6 centimeters and the attachment strip 32 can have a length of about 6 inches or 15 centimeters). As illustrated, the attachment strip 32 and the support layer 31 are of about the same width (alternatively they may be of different widths), and the second major surface of the attachment strip 32 is firmly attached to one of the major surfaces of the support layer 31 with the opposite longitudinal edges of the attachment strip 32 and the support layer 31 parallel and aligned with each other. The attachment strip 32 comprises a first layer 34 of stretch release adhesive defining the first major surface of the attachment strip 32, which layer 34 of stretch release adhesive is adapted to adhere the tape laminate 30 to a substrate. A tab portion 36 provided at one end of the attachment strip 32 can be manually engaged and pulled by a person to sequentially stretch the layer 34 of stretch release adhesive and thereby release adhesive engagement of the first layer 34 of stretch release adhesive with the substrate to which the first major surface of the attachment strip 32 is adhered. A conventional, easily removable, release liner 33 covers the first major surface of the attachment strip 32 defined by the first layer 34 of stretch release adhesive prior to use of the tape laminate 30.

The tape laminate 30 further includes means for facilitating engagement of objects to be supported by the tape laminate 30. That means is provided by a fastener comprising first and second releasably engageable portions 37 and 38, with the portions 37 and 38 of the fastener being attached to opposite end portions of the support layer 31. The conformable support layer 31 can be wrapped around one or more elongate members (e.g., one or a bundle of electrical wires or pipes 35 as is illustrated in FIG. 5), the fastener portions 37 and 38 can be engaged, and the support layer 31 can be adhered to a substrate (e.g., a floor or a wall 39 as is illustrated in FIG. 5) by the layer 34 of stretch release adhesive so that the tape laminate 30 supports and/or locates the elongate member 35 along that substrate 39 as is illustrated in FIG. 5. Removal of the tape laminate 30 from that substrate 39 then only requires pulling on the tab portion 36 to sequentially stretch and release adhesion of the layer 34 of stretch release adhesive. The attachment strip 32 could have any of the structures described above for the attachment strip 12 so that when stretched it will release adhesive engagement from both that substrate 39 and the support layer 31. The attachment strip 32 will then still be secured around the elongate members 35 by the fastener until its portions 37 and 38 are separated from each other.

The fastener is illustrated as a hook and loop fastener, the portion 37 being the loop and the portion 38 being the hook. Alternatively, the fastener could be any of several known types of fasteners that have two releasably engageable portions, such as a snap fastener, a magnetic fastener, or the type of fastener generally described in U.S. Pat. No. 4,290, 174, the content whereof is hereby incorporated herein by reference.

Figure 6:
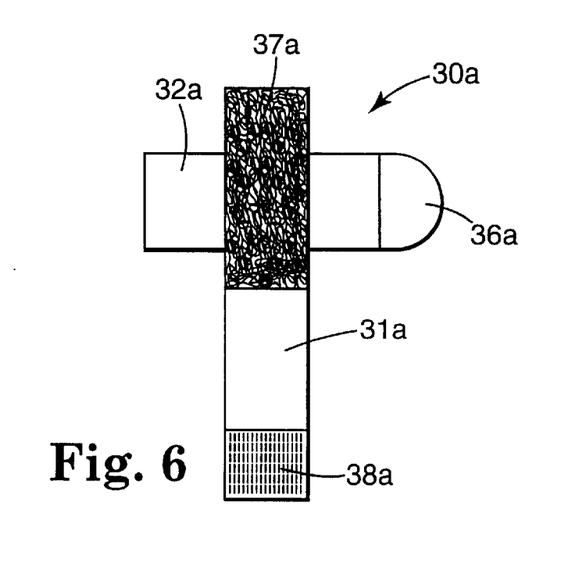
FIG. 6 is a front view of a third embodiment of a tape laminate according to the present invention.

FIG. 6 of the drawing illustrates a third embodiment of a tape laminate according to the present invention generally designated by the reference numeral 30a in which structural elements that are essentially the same as the structural elements of the tape laminate 30 are identified by the same reference numeral to which has been added the suffix "a". The tape laminate 30a includes a support layer 31a, an attachment strip 32a and a fastener including fastener portions 37a and 38a having the same structure described above with reference to the tape laminate 30. The tape laminate 30a differs from the tape laminate 30 only in that the second major surface of the attachment strip 32a is firmly attached to one of the major surfaces of the support layer 31a with the opposite longitudinal edges of the attachment strip 32a and the support layer 31a disposed at right angles to each other.

Figure 7:
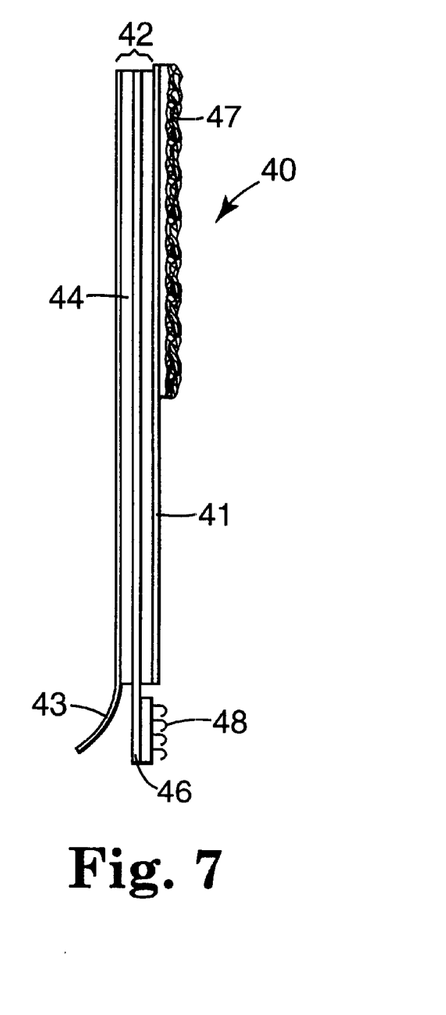
FIG. 7 is a side view of a fourth embodiment of a tape laminate according to the present invention.
Figure 8:
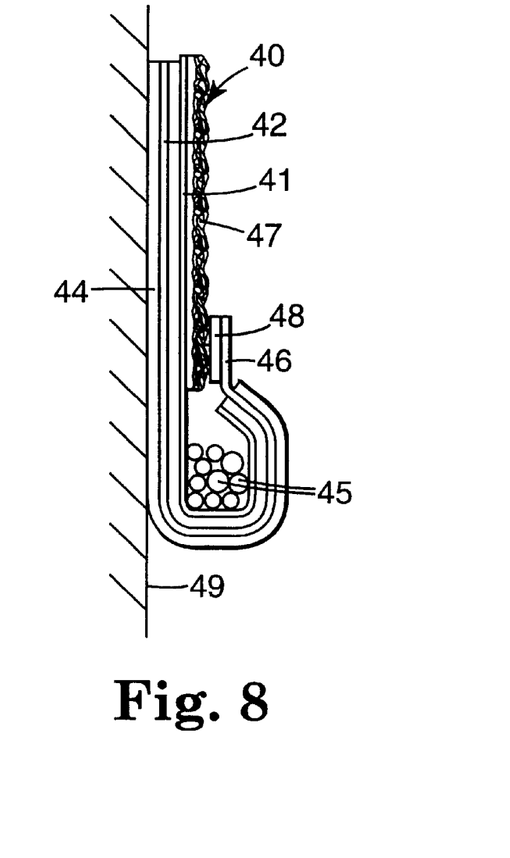
FIG. 8 is a side view of the tape laminate embodiment of FIG. 7 supporting an object along a vertical wall.

Referring now to FIGS. 7 and 8 of the drawing, there is illustrated a fourth embodiment of a tape laminate according to the present invention generally designated by the reference numeral 40.

The tape laminate 40 consists of a support layer 41 of strong, flexible, conformable, essentially non stretchable material (e.g., 0.004 inch or 0.01 cm thick polyester film) having opposite ends and opposite major surfaces extending between those ends; and an attachment strip 42 also having opposite ends and first and second opposite major surfaces extending between its ends. The attachment strip 42 is slightly longer than the support layer 41. The attachment strip 42 and the support layer 41 are of about the same width, and the second major surface of the attachment strip 42 is firmly attached to one of the major surfaces of the support layer 41 with the opposite longitudinal edges of the attachment strip 42 and the support layer 41 generally parallel and aligned with each other. The attachment strip 42 comprises a first layer 44 of stretch release adhesive defining the first major surface of the attachment strip 42, which layer 44 of stretch release adhesive is adapted to adhere the tape laminate 40 to a substrate. The attachment strip 42 could have any of the structures described above for the attachment strip 12. A conventional, easily removable, release liner 43 covers the first major surface of the attachment strip 42 defined by the first layer 44 of stretch release adhesive prior to use of the tape laminate 40.

The tape laminate 40 further includes means for facilitating engagement of objects to be supported by the tape laminate 40. That means is provided by a fastener comprising first and second releasably engageable portions 47 and 48, which is illustrated as a hook and loop fastener, the portion 47 being the loop and the portion 48 being the hook. Alternatively, the fastener could be any of the types of fasteners described above for use on the tape laminate 30. The loop portion 47 of the fastener is attached to the support layer 41 at one end, whereas the hook portion 48 of the fastener is attached to a tab portion 46 of the attachment strip 42 that projects past the end of the support layer 41 opposite the loop portion 47 of the fastener. The hook portion 48 of the fastener is combined with the tab portion 46 of the attachment strip 42 and may be manually engaged to sequentially stretch of the layer 44 of stretch release adhesive by pulling on the tab/hook portion 47, 48, thereby releasing adhesive engagement of the first layer 44 of stretch release adhesive from the substrate to which the first major surface of the attachment strip 42 is adhered. The conformable support layer 41 can be wrapped around one or more elongate members (e.g., one or a bundle of electrical wires or pipes 45 as illustrated in FIG. 8), the fastener portions 47 and 48 can be engaged, and the support layer 41 can be adhered to a substrate (e.g., a floor or a wall 49 as is illustrated in FIG. 8) by the layer 44 of stretch release adhesive so that the tape laminate 40 supports and/or locates the elongate members 45 along that substrate 49 as is illustrated in FIG. 8. Removal of the tape laminate 41 from that substrate 49 then only requires separation of the fastener portions 47 and 48 and sequential stretching of the layer 44 of stretch release adhesive by manually pulling on the combined tab and fastener portion 47, 48 of the attachment strip 42.

Figure 9:
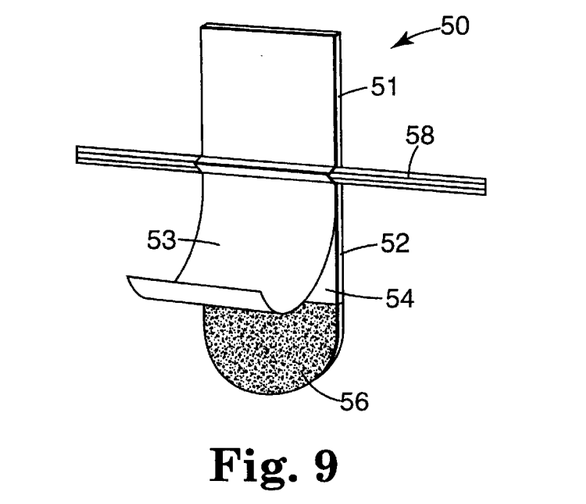
FIG. 9 is a perspective view of a fifth embodiment of a tape laminate according to the present invention.
Figure 10:
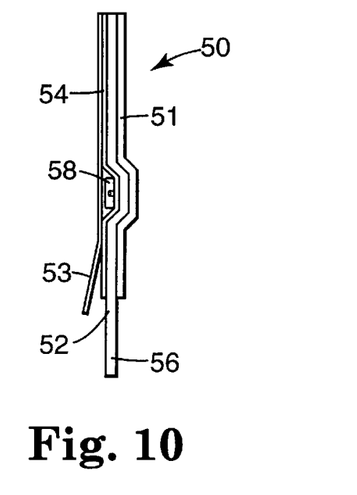
FIG. 10 is a side view of the tape laminate embodiment of FIG. 9.

Referring now to FIGS. 9 and 10 of the drawing, there is illustrated a fifth embodiment of a tape laminate according to the present invention generally designated by the reference numeral 50.

The tape laminate 50 consists of a support layer 51 of strong, flexible, conformable, essentially non stretchable material (e.g., 0.004 inch or 0.01 cm thick polyester film) having opposite ends and opposite major surfaces extending between those ends; and an attachment strip 52 also having opposite ends and first and second opposite major surfaces extending between its ends. The attachment strip 52 is about the same length as the support layer 51, the attachment strip 52 and the support layer 51 are of about the same width, and the second major surface of the attachment strip 52 is firmly attached to one of the major surfaces of the support layer 51 with the opposite longitudinal edges of the attachment strip 52 and the support layer 51 parallel and aligned with each other. The second major surface of the attachment strip 52 is firmly attached to one of the major surfaces of the support layer 51. The attachment strip 52 comprises a first layer 54 of stretch release adhesive defining the first major surface of the attachment strip 52, which layer 54 of stretch release adhesive is adapted to adhere the tape laminate 50 to a substrate. A tab portion 56 at one end of the attachment strip 52 can be manually engaged and pulled by a person to sequentially stretch the layer 54 of stretch release adhesive and thereby release adhesive engagement of the first layer 54 of stretch release adhesive with the substrate to which the first major surface of the attachment strip 52 is adhered. The attachment strip 52 could have any of the structures described above for the attachment strip 12. A conventional, easily removable, release liner 53 covers the first major surface of the attachment strip 52 defined by the first layer 54 of stretch release adhesive prior to use of the tape laminate 50.

The tape laminate 50 further includes means for facilitating engagement of objects to be supported by the tape laminate 50. That means is provided by an elongate bundling means or attachment member 58 illustrated as a twist tie including a bendable, shape retaining, metal wire; but which, alternatively, could be a different elongate attachment member such as a conventional cable tie, a length of string or cord, or a resiliently elastic (i.e., rubber) band. The attachment member 58 extends transversely across the major surface of the support layer 51 defined by the first layer 54 of stretch release adhesive about midway between its ends. End portions of the elongate attachment member 58 project past the opposite edges of the support layer 51. Those end portions of the attachment member 58 are adapted to be engaged on the side of the support layer 51 opposite the attachment strip 52 to support or locate an object along that side of the support layer 51. Such engagement can be caused by twisting the end portions together if the attachment member 58 is a twist tie as illustrated, or by having an end portion with teeth along its length engaged through a passageway in a portion at its opposite end that engages one of those teeth if the attachment member is a cable tie, or by tying together ends of a string or cord used as the attachment member, or by stretching a portion of an elastic attachment member around the object.

Removal of the tape laminate 50 from that substrate then only requires manually pulling on the tab portion 56 to sequentially stretch the layer 54 of stretch release adhesive, which leaves the attachment member 58 still engaged around the object.

Figure 11:
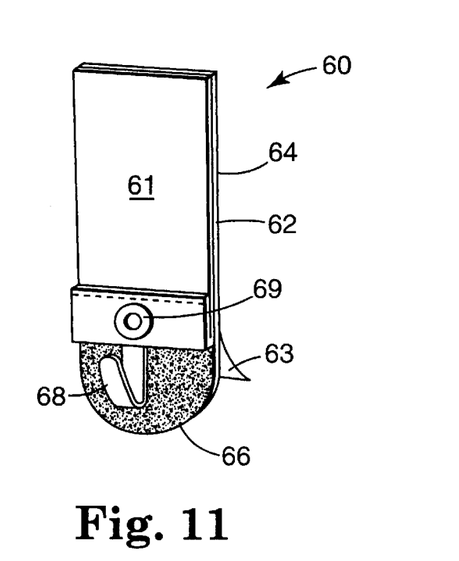
FIG. 11 is a perspective view of a sixth embodiment of a tape laminate according to the present invention.
Figure 12:
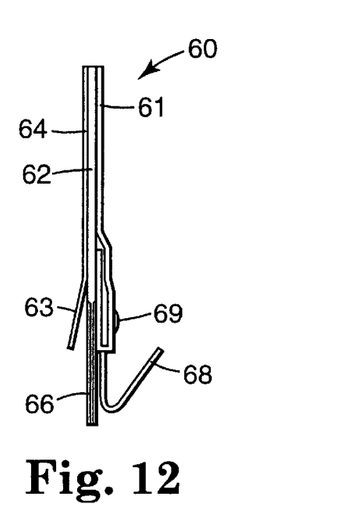
FIG. 12 is a side view of the tape laminate embodiment of FIG. 11.

Referring now to FIGS. 11 and 12 of the drawing, there is illustrated a sixth embodiment of a tape laminate according to the present invention generally designated by the reference numeral 60.

The tape laminate 60 consists of a support layer 61 of strong, flexible, conformable, essentially non stretchable material (e.g., a woven fabric) having opposite ends and opposite major surfaces extending between those ends; and an attachment strip 62 also having opposite ends and first and second opposite major surfaces extending between its ends. The attachment strip 62 and the support layer 61 are of about the same width, and the second major surface of the attachment strip 62 is firmly attached to one of the major surfaces of the support layer 61 with the opposite longitudinal edges of the attachment strip 62 and the support layer 61 generally parallel and aligned with each other. The attachment strip 62 comprises a first layer 64 of stretch release adhesive defining the first major surface of the attachment strip 62, which layer 64 of stretch release adhesive is adapted to adhere the tape laminate 60 to a substrate. A tab portion 66 provided at one end of the attachment strip 62 can be manually engaged and pulled by a person to sequentially stretch the layer 64 of stretch release adhesive and thereby release adhesive engagement of the first layer 64 of stretch release adhesive with the substrate to which the first major surface of the attachment strip 62 is adhered. The attachment strip 62 could have any of the structures described above for the attachment strip 12. A conventional, easily removable, release liner 63 covers the first major surface of the attachment strip 62 defined by the first layer 64 of stretch release adhesive prior to use of the tape laminate 60.

The tape laminate 60 further includes means for facilitating engagement of objects to be supported by the tape laminate 60. That means is a rigid bent sheet metal hook 68 attached to and projecting from one end portion of the support layer 61 on the side of the support layer 61 opposite the attachment strip 62. That end portion of the support layer 61 is folded over and one end of the hook 68 is attached thereto by a rivet 69. The hook 68 is adapted to support or locate an object along the side of the support layer 61 opposite the attachment strip 62. Removal of the tape laminate 61 from that substrate then only requires manual pulling on the tab portion 66 to sequentially stretch the layer 64 of stretch release adhesive.

Figure 13:
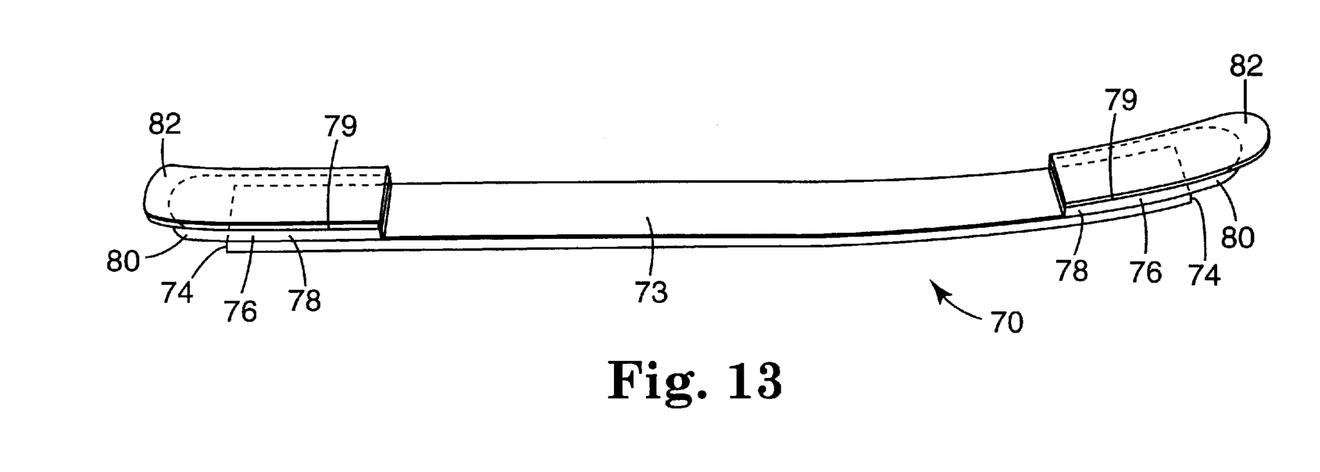
FIG. 13 is a perspective view of an adaptation of a tape laminate according to the present invention.
Figure 14:
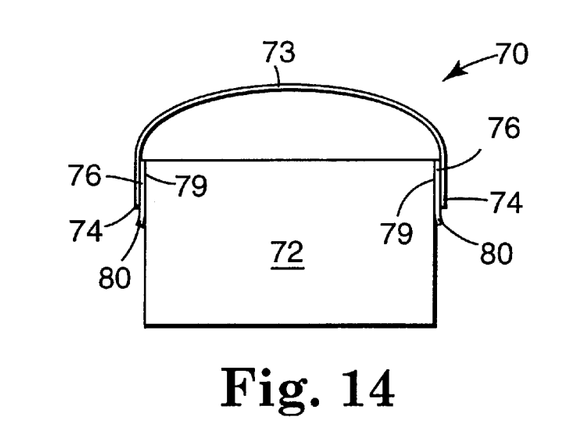
FIG. 14 is a side view of the tape laminate adaptation of FIG. 13.

FIGS. 13 and 14 illustrate an adaptation of a tape laminate according to the present invention that provides an easily attachable and removable handle 70 for carrying a member 72, (e.g., a package; a sheet of material such as glass, metal or plastic; a can of material such as paint; or a beverage container). The tape laminate or handle 70 comprises an elongate support layer 73 of strong, flexible, conformable, essentially non stretchable material (e.g., polyester film, or fiberglass filament reinforced polymeric material such as the backing of filament tape) having opposite ends 74 and opposite major surfaces extending between its ends 74; and two attachment strips 76. Each attachment strip 76 comprises a first layer 78 of stretch release adhesive defining a first major surface 79 of the attachment strip 76 that is adapted to adhere the attachment strip 76 to the member 72. A second major surface of each attachment strip 76 is firmly attached to one of the major surfaces of the support layer 73 adjacent a different opposite end 74 of the support layer 73 with a portion of the support layer 73 at least 4 inches long extending between the spaced attachment strips 76. Each of the attachment strips 76 has a manually engageable tab portion 80 at one of its ends that affords stretching of the first layer 78 of stretch release adhesive by pulling on the tab portion 80 to release adhesive engagement of the first layer 78 of stretch release adhesive with the member 72 to which the first major surface of the attachment strip is adhered. The attachment strips 76 could have any of the structures described above for the attachment strip 12.

The handle can easily be applied to a member 72 such as a package that is purchased in a store by first removing release liners 82 (not shown) which are adhered over the first major surfaces 79 of the attachment strips 76, and then pressing those first major surfaces 79 of the attachment strips 76 against portions of the member 72 or package (see FIG. 14) that are spaced to leave the portion of the support layer 73 between the attachment strips projecting from the surface of the member 72 or package where it can be engaged by a persons hand. If it is later desired to remove the handle 70 (e.g., if the member 72 or package is to be saved by the customer or is later returned to the store from which it is purchased and is to be re-sold), the handle 70 can easily be removed by pulling the tab portions 80 to stretch the layer 78 of adhesive so that it releases from the member 72 or package, leaving the member 72 or package free of damage from removal of the layer 78 of adhesive. Handles 70 of different lengths can be supplied to accommodate members 72 of different sizes and shapes and provide different lengths for the portion of the support layer 73 extending between the spaced attachment strips 76. For example, lengths of the support layers 73 extending between the attachment strips 76 of about 4 inches or about 10 centimeters long or longer are useful if the handles 70 are intended to be held in a persons hand; whereas shorter lengths of the support layers 73 extending between the attachment strips 76 (i.e., as short as about 1 inch or about 2.54 centimeters long) could also be useful if, for example, the handles are intended to be engaged by a single finger or by a hook.

The present invention has now been described with reference to several embodiments and several possible modifications thereof. It will be apparent to those skilled in the art that many changes can be made in the embodiments described without departing from the scope of the present invention. Thus, the scope of the present invention should not be limited to the structures and methods described in this application, but only by the structures and method described by the language of the claims and the equivalents thereof.

What is claimed is:

1. In combination:
    a substrate;
    a member; and
    a tape laminate locating the member along the substrate, said tape laminate comprising:
        a support layer of strong, flexible, conformable, essentially non stretchable material having opposite ends and opposite major surfaces extending between said ends; and
        an attachment strip having opposite ends and first and second opposite major surfaces extending between said ends of said attachment strip, said attachment strip comprising a first layer of stretch release adhesive defining said first major surface of said attachment strip, said second major surface of said attachment strip being firmly attached to one of said major surfaces of said support layer, a first part of said first major surface of said attachment strip along a first part of said support layer being adhered to said substrate, and a second part of said first major surface of said attachment strip along a second part of said support layer being adhered to said member, the support layer restricting stretching of the attachment strip due to forces applied to the tape laminate and said attachment strip having a manually engageable tab portion at one of said ends affording stretching of said first layer of stretch release adhesive by pulling on said tab portion to release adhesive engagement of said first layer of stretch release adhesive from said substrate and said member.

2. A tape laminate adapted to support or locate a member along a substrate, said tape laminate comprising:
    a support layer of strong, flexible, conformable, essentially non stretchable material having opposite ends and opposite major surfaces extending between said ends;
    an attachment strip having opposite ends and first and second opposite major surfaces extending between said ends of said attachment strip, said attachment strip comprising a first layer of stretch release adhesive defining said first major surface of said attachment strip and adapted to adhere the attachment strip to the substrate, said second major surface of said attachment strip being firmly attached to one of said major surfaces of said support layer, and said attachment strip having a manually engageable tab portion at one of said ends affording stretching of said first layer of stretch release adhesive by pulling on said tab portion to release adhesive engagement of said first layer of stretch release adhesive with a substrate to which said first major surface of said attachment strip is adhered; and
    means for facilitating engagement of a member to be supported or located by the tape laminate comprising a fastener including first and second releasably engageable portions, said portions of said fastener being attached adjacent opposite ends of said support layer and said support layer being adapted to extend around the member with said fastener portions engaged.

3. A tape laminate according to claim 2 wherein both said support layer and said attachment strip are elongate between said ends and have elongate edges, and said support layer and said attachment strip are disposed with their elongate edges generally parallel to each other.

4. A tape laminate according to claim 2 wherein both said support layer and said attachment strip are elongate between said ends and have opposite elongate edges, and said support layer and said attachment strip are disposed with their elongate edges generally at right angles to each other.

5. A tape laminate according to claim 2 wherein said attachment strip comprises a layer of stretch release pressure sensitive adhesive defining said first major surface of said attachment strip, and a layer of stretchable polymeric material having a major surface to which said layer of stretch release pressure sensitive adhesive is adhered.

6. A tape laminate according to claim 2 wherein said attachment strip comprises a first layer of stretchable polymeric material having opposite major surfaces with one major surface of the first layer of stretchable polymeric material being bonded to said first layer of stretch release adhesive, said attachment strip further including a layer of polymeric foam having opposite major surfaces with one major surface of said layer of foam bonded on the surface of said first layer of polymeric material opposite said first layer of stretch release adhesive, a second layer of polymeric material having opposite major surfaces with one of the major surfaces of said second layer of polymeric material adhered to the major surface of said layer of foam opposite said first layer of polymeric material, and a second layer of stretch release adhesive adhering the second layer of polymeric material to said support layer.

7. A tape laminate according to claim 2 wherein said first layer of stretch release adhesive defines both said first and second major surfaces of said attachment strip and adheres said attachment strip to said support layer.

8. A tape laminate adapted to support or locate a member along a substrate, said tape laminate comprising:
  a support layer of strong, flexible, conformable, essentially non stretchable material having opposite ends and opposite major surfaces extending between said ends;
  an attachment strip having opposite ends and first and second opposite major surfaces extending between said ends of said attachment strip, said attachment strip comprising a first layer of stretch release adhesive defining said first major surface of said attachment strip and adapted to adhere the attachment strip to the substrate, said second major surface of said attachment strip being firmly attached to one of said major surfaces of said support layer, and said attachment strip having a manually engageable tab portion at one of said ends affording stretching of said first layer of stretch release adhesive by pulling on said tab portion to release adhesive engagement of said first layer of stretch release adhesive with a substrate to which said first major surface of said attachment strip is adhered; and
  means for facilitating engagement of a member to be supported or located by the tape laminate comprising a fastener including first and second releasably engageable portions, one of said portions of said fastener being attached at one end of said attachment strip and providing said tab portion, and the other of said fastener portions being attached to said support layer at the end of said support layer opposite said tab portion, said support layer and attachment strip being adapted to extend around an elongate member with said fastener portions engaged.

9. A tape laminate adapted to support or locate a member along a substrate, said tape laminate comprising:
  a support layer of strong, flexible, conformable, essentially non stretchable material having opposite ends and opposite major surfaces extending between said ends;
  an attachment strip having opposite ends and first and second opposite major surfaces extending between said ends of said attachment strip, said attachment strip comprising a first layer of stretch release adhesive defining said first major surface of said attachment strip and adapted to adhere the attachment strip to the substrate, said second major surface of said attachment strip being firmly attached to one of said major surfaces of said support layer, and said attachment strip having a manually engageable tab portion at one of said ends affording stretching of said first layer of stretch release adhesive by pulling on said tab portion to release adhesive engagement of said first layer of stretch release adhesive with a substrate to which said first major surface of said attachment strip is adhered; and
  means for facilitating engagement of a member to be supported or located by the tape laminate;
  both said support layer and said attachment strip being elongate between said ends and have opposite elongate edges, said support layer and said attachment strip being disposed with their elongate edges generally parallel to each other, and said means for facilitating engagement of a member to be supported or located by the tape laminate comprising an elongate attachment member extending generally at a right angle to said longitudinal edges transversely across and adjacent the major surface of said support layer to which said attachment strip is firmly attached, said elongate attachment member having end portions projecting past said elongate edges of said support layer and adapted to be releasably engaged on the side of said support layer opposite said attachment strip to support or locate an object along the side of said support layer opposite said attachment strip.

10. A tape laminate according to claim 9 wherein said elongate attachment member is a twist tie comprising a bendable, shape retaining, metal wire.

11. A tape laminate according to claim 9 wherein said elongate attachment member is a cable tie.

12. A tape laminate adapted to support or locate a member along a substrate, said tape laminate comprising:
  a support layer of strong, flexible, conformable, essentially non stretchable material having opposite ends and opposite major surfaces extending between said ends;
  an attachment strip having opposite ends and first and second opposite major surfaces extending between said ends of said attachment strip, said attachment strip comprising a first layer of stretch release adhesive defining said first major surface of said attachment strip and adapted to adhere the attachment strip to the substrate, said second major surface of said attachment strip being firmly attached to one of said major surfaces of said support layer, and said attachment strip having a manually engageable tab portion at one of said ends affording stretching of said first layer of stretch release adhesive by pulling on said tab portion to release adhesive engagement of said first layer of stretch release adhesive with a substrate to which said first major surface of said attachment strip is adhered; and
  means for facilitating engagement of a member to be supported or located by the tape laminate;
  both said support layer and said attachment strip being elongate between said ends and having opposite elongate edges, said support layer and said attachment strip being disposed with their elongate edges generally parallel to each other, and said means for facilitating engagement of a member to be supported or located by the tape laminate comprising an elongate attachment member extending generally at a right angle to said longitudinal edges transversely across and adjacent the major surface of said support layer to which said attachment strip is firmly attached, said elongate attachment member having portions projecting past said elongate edges of said support layer and engaged on the side of said support layer opposite said attachment strip to support or locate an object along the side of said support layer opposite said attachment strip.

13. A tape laminate according to claim 12 wherein said elongate attachment member is a resiliently elastic band.

14. A tape laminate adapted to support or locate a member along a substrate, said tape laminate comprising:
  a support layer of strong, flexible, conformable, essentially non stretchable material having opposite ends and opposite major surfaces extending between said ends;
  an attachment strip having opposite ends and first and second opposite major surfaces extending between said ends of said attachment strip, said attachment strip comprising a first layer of stretch release adhesive defining said first major surface of said attachment strip and adapted to adhere the attachment strip to the substrate, said second major surface of said attachment strip being firmly attached to one of said major surfaces of said support layer, and said attachment strip having a manually engageable tab portion at one of said ends affording stretching of said first layer of stretch release adhesive by pulling on said tab portion to release adhesive engagement of said first layer of stretch release adhesive with a substrate to which said first major surface of said attachment strip is adhered; and
  means for facilitating engagement of a member to be supported or located by the tape laminate comprising a rigid hook attached adjacent one of said ends of said support layer on the side of said support layer opposite said attachment strip, said hook being adapted to support or locate an object along the side of said support layer opposite said attachment strip.

15. A tape laminate adapted to provide an easily attachable and removable handle for carrying a member, said tape laminate comprising:

an elongate support layer of strong, flexible, conformable, essentially non stretchable material having opposite ends and opposite major surfaces extending between said ends;

two attachment strips, each attachment strip having opposite ends and first and second opposite major surfaces extending between said ends of said, attachment strip, said attachment strips each comprising a first layer of stretch release adhesive defining said first major surface of said attachment strip and adapted to adhere the attachment strip to the member, said second major surfaces of said attachment strips being firmly attached to one of said major surfaces of said support layer adjacent opposite ends of said support layer with a portion of said support layer at least 1 inch or 2.54 centimeters long extending between said attachment strips, and each of said attachment strips having a manually engageable tab portion at one of said ends of said attachment strip affording stretching of said first layer of stretch release adhesive by pulling on said tab portion to release adhesive engagement of said first layer of stretch release adhesive with a member to which said first major surfaces of said attachment strips are adhered.

16. A tape laminate according to claim 15, wherein said portion of said support layer extending between said attachment strips is at least 4 inches or 10 centimeters long.

* * * * *